United States Patent Office 2,705,684
Patented Apr. 5, 1955

2,705,684
PRODUCTION OF PRINTED FLOOR COVERINGS

James E. Hazeltine, Jr., Lancaster, Pa., assignor to Armstrong Cork Company, Lancaster, Pa., a corporation of Pennsylvania No Drawing. Application April 10, 1952,
Serial No. 281,670

3 Claims. (Cl. 117—15)

This invention relates to printed floor coverings. More particularly, the invention relates to printed felt base floor coverings produced by a method in which a vinyl resin decorative wearing surface is applied to a previously-treated saturated felt base by block printing techniques, and the resulting product is subjected to comparatively high temperatures to produce a smooth wearing surface of fused vinyl resin.

Felt base floor coverings are well known to the art. Generally speaking, they have been produced by saturating a sheet of felt with asphalt or other waterproofing agent, coating the saturated sheet with a backing paint and a coating paint to provide a smooth surface for deposit thereon of a decorative wearing surface. The coating paints heretofore used have been oleoresinous varnishes and are generally applied by means of a knife-coating operation. The thus coated saturated felt is then slowly passed through a block printing machine in which a series of blocks applies various colors to the coated felt to produce a decorative wearing surface in the desired pattern. Ordinarily, the print paint, which is the term commonly used in the art to describe the material used to form the decorative wearing surface, has been an oleoresinous material or, in some instances, synthetic resinous materials.

Although these printed felt base floor coverings have been sold for a number of years and have met with public acceptance, because of the nature of the block printing process it was not possible to utilize a number of the more recently developed synthetic resins which possess highly desirable characteristics from the standpoint of a decorative wearing surface in a felt base floor covering. For example, the vinyl resins, such as polyvinyl chloride, copolymers of vinyl chloride and vinyl acetate containing about 5% to 15% by weight of polymerized vinyl acetate, copolymers of vinyl chloride with vinylidene chloride, and the like, could not be used because they were not adapted to use in the block printing machines.

Recently, there has been developed a printed felt base floor covering in which the decorative wearing surface is obtained by block printing a dispersion or suspension of vinyl resin onto the coated saturated felt base, utilizing conventional block printing equipment. Such a floor covering is disclosed in my copending application Serial No. 207,576, filed January 24, 1951 and now Patent No. 2,624,682. A typical formulation for the wearing surface is as follows:

| | Parts by weight |
|---|---|
| Titanium dioxide pigment | 80 |
| Lead chromate pigment | 16 |
| Dioctyl phthalate plasticizer | 136 |
| Vinyl chloride-vinyl acetate copolymer resin | 410 |
| Mineral spirits | 110 |
| Butylated urea-formaldehyde resin (60% solids in 50-50 butanol xylene) | 13.8 |

The titanium dioxide and lead chromate serve as coloring matter for the coating dispersion and the dioctyl phthalate as a plasticizer for the vinyl copolymer, the latter serving as the film-forming resin.

Such products are obtained by passing a coated saturated felt sheet through the conventional block printing equipment to print thereon a vinyl resin decorative wear layer and fusing the printed vinyl resin layer at comparatively high temperatures, which temperatures are substantially higher than those normally employed in the production of conventional printed felt base floor coverings having a synthetic resin other than a vinyl resin as the decorative wearing surface. The reason for this higher temperature is to fuse the vinyl resin film, thereby imparting desirable properties to the finished product. Although such printed floor coverings possess excellent wear resistance, excellent resistance to alkali such as is normally used in cleaning preparations, and other outstanding qualities, it was found that after comparatively short periods of time the floor covering would tend to curl toward the surface on which the vinyl resin had been deposited. Since it is generally the practice in the installation of printed floor coverings to avoid the use of adhesives, this presented a very serious problem because the curled floor covering presented a very unsightly appearance.

I have found that this curling may be substantially completely eliminated by maintaining the proper plasticizer concentration in the plasticized polyvinyl chloride or other vinyl resin film employed as the decorative wearing surface. In order to prohibit plasticizer from leaving the printed vinyl resin film, it is necessary to provide means to prevent plasticizer from being absorbed by the coating paints upon which the decorative wearing surface is printed.

In accordance with my invention, the waterproof foundation which is typically as asphalt-impregnated felt is coated with a conventional casein type backing paint and one or more coats of a conventional coating paint, which may be an oleoresinous material such as one obtained by oxidizing linseed oil or other drying oils in the presence of a resin such as rosin. Such oleoresinous coating paints are well known to the art and form no part of this invention. After application of the desired number of coats of coating paint to the impregnated foundation, an adhesive coating paint or anchor coat is applied. Such adhesive coating paints are typified by those described in copending application Serial No. 277,584, filed March 20, 1952, by Irving I. Bezman and Daniel D. Browning. As disclosed in said copending application, advantageous results are obtained when the adhesive coating paint contains about 20% to about 50% rubberlike polymer-resin mixture and about 80% to about 50% inert filler; the binder mixture advantageously contains about 25% to 80% rubberlike polymer and about 75% to 20% reinforcing resin. If less than about 25% rubberlike polymer is employed, the coating paint does not key well to the saturated felt base. If less than about 20% reinforcing resin is contained in the coating paint, a good key between the paint and the vinyl resin decorative coat is not obtained. Particularly advantageous results have been obtained with compositions containing 40% to 65% rubberlike polymer and 60% to 35% reinforcing resin. As to the quantity of inert filler, with less than about 50% filler the desired "tooth" or mechanical bond between the coating paint and adjacent surfaces is not obtained. However, when more than about 80% filler is used, the coating paint possesses very little internal strength. Typical examples of tackifiers and reinforcing agents which may be used are the following:

A. *Tackifiers*

1. A styrene-butadiene copolymer containing 30-60 parts of styrene and 70-40 parts of butadiene.
2. An acrylonitrile-butadiene copolymer containing 55-80 parts of butadiene and 45-20 parts of acrylonitrile.
3. An isobutylene-isoprene copolymer containing 97-99 parts of isobutylene with 3-1 parts of isoprene.
4. A polychloroprene.

B. *Reinforcing agents*

1. Polyvinyl chloride.
2. A copolymer of polyvinyl chloride and polyvinyl acetate containing 95-80 parts of polyvinyl chloride with 5-20 parts of polyvinyl acetate.
3. A polyvinyl chloride-polyvinylidene chloride copolymer containing a majority of polyvinylidene chloride.
4. A styrene-butadiene-copolymer containing 98-80 parts of styrene with 2-20 parts of butadiene.
5. Polystyrene.

Various combinations of tackifier with reinforcing agent have been used and found to be successful for the purpose. The preferred binder formulation contains 35–60 parts of polyvinyl chloride with 65–40 parts of a butadiene-acrylonitrile copolymer containing 65 parts of butadiene and 35 parts of acrylonitrile. Best results were obtained with a ratio of 55 parts of polyvinyl chloride together with 45 parts of the butadiene-acrylonitrile copolymer. A second preferred composition contains 50–80 parts of a butadiene-acrylonitrile copolymer (65 parts of butadiene—35 parts of acrylonitrile) with 50–20 parts of a resinous copolymer of vinyl chloride and vinylidene chloride. Best results were obtained with a ratio of 70 parts of the butadiene-acrylonitrile copolymer together with 30 parts of resinous copolymer.

In each instance about 1 to 4 parts of an inert filler, such as wood flour, micronized slate, whiting, clay, and the like, are employed for 1 part of the binder or resin-rubberlike polymer mixture.

After application of the anchor coat, which may be one or more coats as described above, a plasticizer coat is applied so as to maintain an excess of plasticizer in and/or over the anchor coat. Any of a number of well-known plasticizers for polyvinyl resins, such as vinyl chloride and copolymers of vinyl chloride, may be used. Particularly suitable are those which find use in the preparation of vinyl resin organosols, as such materials are preferred materials in the production of printed vinyl resin floor coverings of the type with which this invention is concerned. Examples of such plasticizers are trioctyl phthalate, epoxylated soya bean oil, dioctyl adipate, octyl diphenyl phosphate, trioctyl phosphate, tricresyl phosphate, butyl benzyl phthalate, dibutoxyethyl phthalate, dioctyl sebacate, butyl phthalyl butyl glycolate, and the like.

A preferred manner of obtaining the wet plasticizer film involves coating the coated waterproof felt with a mixture containing a dispersion of vinyl resin and a significant proportion of plasticizer. In other words, the last-down coat prior to printing includes the formulation of the wearing surface containing excess plasticizer. A typical formulation would be one containing 3 parts vinyl resin dispersion and 1 part plasticizer.

Immediately upon the application of the plasticizer coat, the decorative wearing surface is deposited by a series of blocks in a conventional block printing machine. Upon application of the blocks to the coated waterproof felt, a plurality of color areas is formed; and because of the condition of the vinyl resin dispersion, these color areas flow into a uniform sharply defined pattern.

The resulting sheet material is then subjected to fusion temperatures by slowly passing the same under a series of heating units. The temperatures to which the film is subjected will vary, depending upon the particular composition thereof; but, generally speaking, the desired fusion can be obtained at temperatures of about 280° F. to about 350° F. Following passage through the fusion zone, the material is ready to be rolled up and transferred to inspection.

Floor coverings made in accordance with my invention are free from the tendency to curl because a plasticizer is retained in the decorative wearing surface film. Thus, I have overcome an extremely difficult problem in the manufacture of such floor covering material.

I claim:

1. A process of making printed felt base floor covering comprising coating a sheet of waterproof felt, applying over said coating a film of a composition containing at least 25% by weight of plasticizer for vinyl resin, block printing a decorative wear layer of a dispersion of plasticized vinyl resin onto said film of plasticizer, and fusing the vinyl resin layer at elevated temperatures.

2. In the method of making felt base floor covering which includes coating a waterproof felt material, block printing a decorative wearing surface containing a vinyl resin over said coating, and fusing said block printed vinyl resin, the improvement comprising providing a wet film containing at least 25% by weigh of plasticizer for said vinyl resin over said coating paint and printing directly on said wet film of plasticizer with a dispersion of plasticized vinyl resin.

3. A method of making printed felt base floor coverings comprising coating a waterproof felt material, applying to said coated felt a coating containing a rubber-like butadiene polymer and a vinyl resin, applying to said last-named coating a composition containing at least 25% by weight of plasticizer for vinyl resin, block printing a dispersion of plasticized vinyl resin onto said composition while the film is wet, and heating the resulting product at a temperature of about 280° F. to about 350° F. to fuse said vinyl resin top coat.

References Cited in the file of this patent

UNITED STATES PATENTS

| | | |
|---|---|---|
| 2,133,886 | Beegle | Oct. 18, 1938 |
| 2,330,353 | Henderson | Sept. 28, 1943 |
| 2,554,899 | Cowgill | May 29, 1951 |
| 2,589,502 | Lurie | Mar. 18, 1952 |
| 2,624,682 | Hazeltine | Jan. 6, 1953 |
| 2,624,683 | Bezman | Jan. 6, 1953 |